United States Patent [19]

Arsenault

[11] Patent Number: 5,555,419
[45] Date of Patent: Sep. 10, 1996

[54] CORRELATION SYSTEM

[75] Inventor: Mark E. Arsenault, Mason, N.H.

[73] Assignee: Digital Equipment Corporation, Maynard, Mass.

[21] Appl. No.: 491,315

[22] Filed: Jun. 16, 1995

Related U.S. Application Data

[63] Continuation of Ser. No. 1,577, Jan. 6, 1993, abandoned.

[51] Int. Cl.⁶ .......................... G06F 11/00; G06F 15/16
[52] U.S. Cl. .................. 395/700; 364/267; 364/267.91; 364/280; 364/228.4; 364/229; 364/DIG. 1; 364/DIG. 2; 364/254.4; 364/280.4
[58] Field of Search .................... 395/700; 364/DIG. 1, 364/DIG. 2, 280, 228

[56] References Cited

U.S. PATENT DOCUMENTS

| | | | |
|---|---|---|---|
| 4,953,084 | 8/1990 | Meloy et al. | 364/200 |
| 5,175,856 | 12/1992 | Van Dyke et al. | 395/700 |
| 5,201,050 | 4/1993 | McKeeman et al. | 395/700 |
| 5,280,613 | 1/1994 | Chan et al. | 395/700 |

*Primary Examiner*—Kevin A. Kriess
*Assistant Examiner*—Majid A. Banankhah
*Attorney, Agent, or Firm*—Dirk Brinkman; Ronald C. Hudgens; Arthur W. Fisher

[57] ABSTRACT

A correlation system communicates with preprocessors and a debugger in a translation system to correlate symbols and code segments of an input user program with symbols and code segments of an output executable version of the program. The correlation system stores information relating to changes to symbols and code segments made by each preprocessor in input correlation tables associated with input files and output correlation tables associated with output files of each preprocessor. The information includes pointers that depict the translations of the symbols and code segments, and information which characterizes the translations as exact, inexact or name change correlations. When the user identifies a symbol or a code segment in an output file, the debugger extracts the symbol name and code segment information from the output correlation table to identify the corresponding symbol or code segment in the input file.

2 Claims, 6 Drawing Sheets

CORRELATION SYSTEM

This application is a continuation of application Ser. No. 08/001,577, filed Jan. 6, 1993, now abandoned.

FIELD OF INVENTION

The invention relates generally to a system for preprocessing, compiling and debugging computer programs, and more particularly, to a mechanism which adds to the system the ability to interpret program-related information produced by a compiler in terms of the high level language programs applied to system preprocessors.

BACKGROUND OF THE INVENTION

A computer programmer, or user, typically writes a computer program in a one of several high level programming languages. This program, referred to herein as a "user program," is then translated into an associated object code file by a compiler and linked with other object code files to produce an executable "image file" which is executed, or run, by processors in a computer system. Accordingly, the system may also include one or more preprocessors which translate the user program into a related source code file, before the compiler converts the source code to object code and sends it to the linker.

The translations which the preprocessors perform may, for example, involve substituting several lines of code for a single high level language command. This changes program line numbers. The translations may also involve altering variable names, for example, changing the names from names which are valid in the high level language to names which are valid in the language(s) used by the preprocessors and/or the compiler. Also, the translation may involve substituting one or more lines of code for a macro, which may be a part of a high level language command.

Computer systems also typically include analysis tools which help a user understand how the systems interpret and execute his or her program. One of these analysis tools is a "debugger," which is an interactive tool that enables a user essentially to interrupt the execution of a program and to view, for example, the values of variables at the time of interruption. The debugger thus allows a user to determine if the program is assigning expected, or realistic, intermediate values to these variables. The debugger also interrupts the execution of the program when an execution error occurs and displays an error message.

The debugger receives information from the linker relating to the relationships between locations and symbols in the image file and lines of code and "symbols" in the source code file. The term "symbols" refers to variables, routines, literals, objects, macros, fields, and any other type of program entity. The linker receives from the compiler a debugger symbol table which describes these relationships for a particular object file. The linker concatenates the tables from each of the linked object code files and produces the image file debugger table, which is then made available to the debugger. The debugger interprets the debugger symbol table to provide to a user information relating to the execution of the program and the intermediate values of symbols, in terms of the lines of code and symbol names of the source code file. The user must then relate this information to the user program in order to modify that program in an attempt to achieve the proper variable values, and correct the execution errors. The user may then, if necessary, send the modified program through the preprocessors and the compiler for further debugging.

For a user to relate the information provided by the debugger to the symbols and code lines of the user program, the user must know how the compiler and each of the preprocessors translated the lines of the user program and/or re-named the symbols. Most users can not readily follow these preprocessor and compiler translations, and thus, they have a difficult time understanding how the system is interpreting their programs. Accordingly, they cannot readily revise the program to produce the desired results.

Systems which use the programming language "C" offer users some help in understanding the translation of their programs. The C language preprocessors include in their preprocessor output files #line directives, which enable the preprocessors to relate lines of the preprocessor output files to lines of the preprocessor input files. Each intermediate preprocessor interprets the #line directive information provided to it by the preceding preprocessor by relating its output file back to the user program, which is the input file of the first preprocessor. Similarly, the C-compiler relates the locations and symbols of the object file back to the user program and provides this information to the linker. The linker includes this information in the debugger symbol table, which it makes available to the debugger. The debugger then uses this information to relate locations in the image file to various lines of the user program.

While the #line directives aid a user in understanding the relationship between particular locations of the image file and lines of the user program, they do not provide a user with information directly relating to the translations of symbol names, or allow a user to examine the intermediate symbol or code line translations performed by the preprocessors. Accordingly, the user may still not understand how the system interprets and/or executes his or her program, and more importantly, how to change the user program to achieve a desired result. Also, the #line directives supply the user with correct information only if all the preprocessors and the compiler understand the directives, that is, only if they are all compatible with the C language.

What is needed is a language-independent mechanism for interpreting translations performed in transforming a user program to a source code file. Such a mechanism should operate with the debugger to provide information to a user in terms of the code lines and symbol names of the user program, while also making available to the user the corresponding code lines and symbol names in the source code file and the intermediate preprocessor files. Further, what is needed is a mechanism which determines intermediate values of symbols, using the user program names of these symbols, regardless of how many times the symbol names and/or the related lines of code change during preprocessing and compiling.

SUMMARY OF THE INVENTION

The invention is a correlation system which communicates with each of the preprocessors to trace translations of code lines and symbol names of a user program through each of the preprocessors. The correlation system also works with the debugger, which has access to the image file debugger symbol table, to provide to a user intermediate symbol values and related information in terms of the symbol names and code lines of the user program.

Each preprocessor sends to the correlation system information which describes the changes the preprocessor makes to symbol names and "segments", which can be lines of code, a particular line of code or a portion of a line of code, of its input file while translating that file to an output file. The correlation system stores this symbol and segment translation information in a database, in the form of a library of correlation tables. Each of the tables consists of entries directed to symbols and segments of either the preprocessor input file or the preprocessor output file and includes pointers that depict the mappings of input file symbols and segments to output file symbols and segments, or vice versa. The correlation system can then trace segments or symbols through these tables to determine relationships between particular symbols and segments of the user program and symbols or segments of the source code file and/or any of the other preprocessor input or output files. The user can thus examine how each of the preprocessors interprets the symbols and code segments of the user program.

More specifically, the first preprocessor in a chain of preprocessors leading to the compiler sends to the correlation system information which identifies the preprocessor input file, i.e., the user program, and the preprocessor output file. The preprocessor also sends to the correlation system information which describes changes in variable names and code segments between the input and output files.

The correlation system stores the information it receives from the preprocessor in a database in the form of associated preprocessor source correlation and target correlation tables, with the source correlation table describing changes to the symbol names and segments in terms of the preprocessor input file and the target correlation table describing the changes in terms of the preprocessor output file. The correlation system includes in each of the entries in the source correlation table a pointer to the associated entry in the target correlation table, and vice versa. The mappings are one-to-one, and thus, if a segment of the preprocessor input file is duplicated in the preprocessor output file, the correlation system includes two corresponding entries in the source and target correlation tables.

The preprocessor also sends to the correlation system information which characterizes the translations as exact, inexact or name change correlations. An exact correlation maps a segment to a duplicate segment; an inexact correlation maps a segment to a related, but not identical, segment; a name change correlation maps a symbol with a given name to a symbol with a different name. A segment translation which is an inexact correlation may include translations of code lines and symbols which are exact, inexact or name change correlations. For each of these latter translations, the correlation system stores in the tables input file-output file mapping information and characterizations, and information which describes the translations as being contained in, or part of, the "parent" segment translation.

The first preprocessor sends its output file to the next preprocessor in the chain. This next preprocessor uses the output file as its input file and similarly sends to the correlation system information which describes the exact, inexact and name change translations made in producing its output file. The correlation system stores this translation information in source and target correlation tables associated with that preprocessor. The preprocessor's output file then becomes the input file for the next preprocessor in the chain, and this preprocessor, in turn, sends to the correlation system information describing its input and output files and the various translations it performs, and so forth, until the last preprocessor in the chain produces the source code file for the compiler. The correlation tables associated with a user program are considered a "correlation library."

The compiler translates the source code file produced by this last preprocessor to produce the object code file and a debugger symbol table. The linker then manipulates the object code file to produce a related, executable image file and concatenates the debugger symbol table produced by the compiler with the debugger symbol tables of the linked object files to produce an image file debugger symbol table. Between the correlation tables in the correlation library and the debugger symbol table, the debugger has available to it information which relates symbols and code segments of the user program to symbols and segments of the source code file and/or symbol values and error messages associated with the execution of the image file.

When the user sends to the debugger a request for an intermediate value of a particular user program symbol, the debugger first examines the debugger symbol table to determine if the symbol is defined therein. If it is, the debugger determines which segment of the source code relates to the evaluation of the symbol and extracts the variable value from that segment. The debugger also sends a query to the correlation system and asks the system to identify the segment of the user program which corresponds to the source code segment. In response, the correlation system traces the source code segment back through the library of correlation tables and identifies to the debugger the related user program segment. The debugger then displays the symbol value and the user program segment.

If the symbol is not identified in the debugger symbol table, the debugger sends a query to the correlation system which asks the system to determine the name of the corresponding symbol in the source code file. The correlation system traces the symbol through the source and target correlation tables in the library and sends to the debugger the name of the corresponding source code symbol, and also identifies a related segment of the user program and a corresponding segment of the source code file. The debugger then evaluates the symbol in the context of the source code file segment, and displays to the user the symbol value and the identified user program segment. The operations performed by debugger and the correlation system in determining segment correspondence and variable name correspondence are described in more detail below.

The correlation system allows a user to inquire about intermediate values of user program symbols, the translation of various routines in the user program into source code or preprocessor code, and so forth, and receive from the debugger responses in terms of the user program code, the source code, or preprocessor input files or output files, as appropriate. Further, the user need not know how the system translates the symbol names or code segments in order to acquire such information.

DESCRIPTION OF THE DRAWINGS

The above and further advantages of the invention may be better understood by referring to the following description in conjunction with the accompanying drawings, in which.

DETAILED DESCRIPTION

Figure 1:
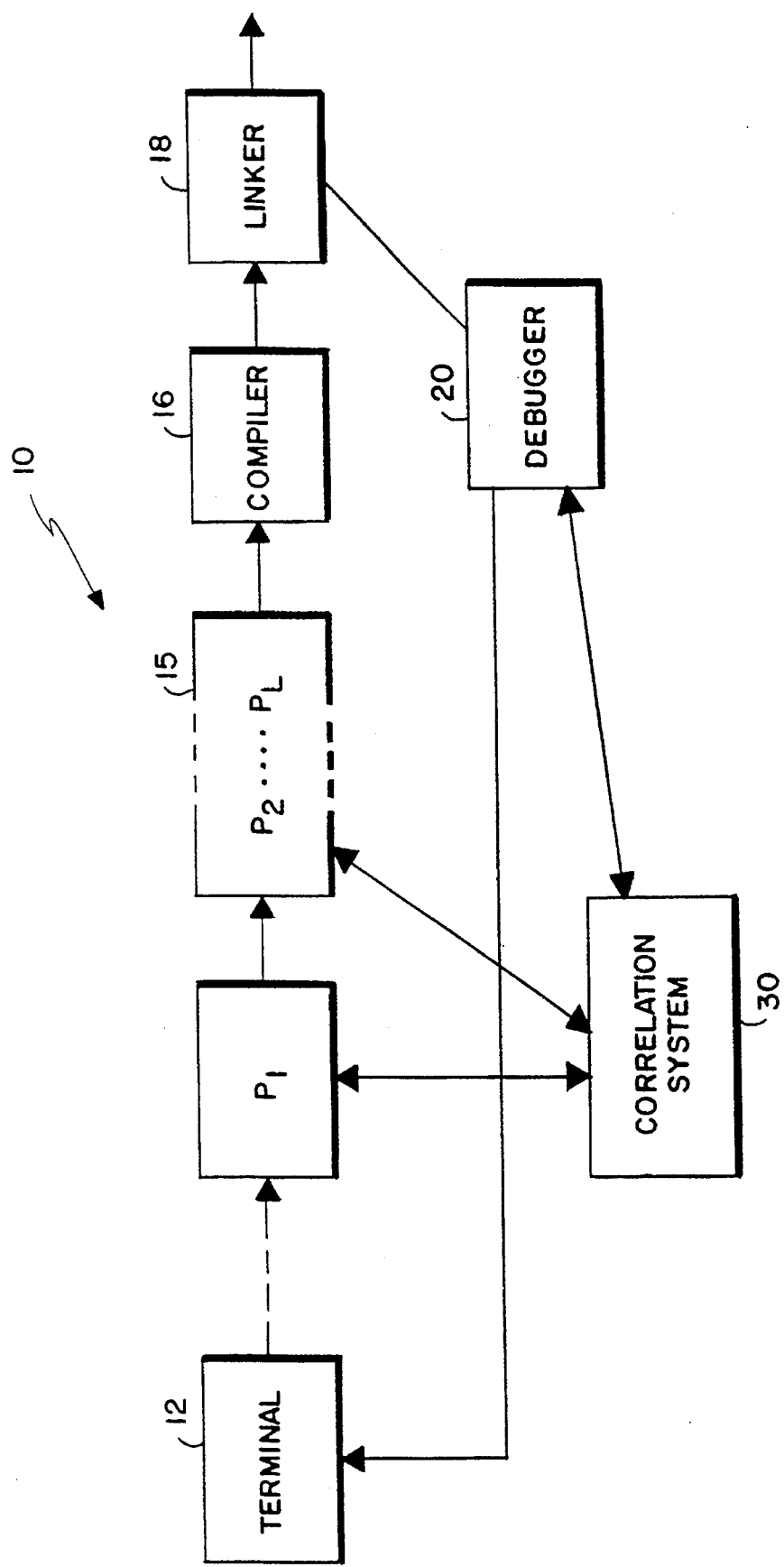
FIG. 1 depicts in block diagram form a computer system constructed in accordance with the current invention.
Figure 2:
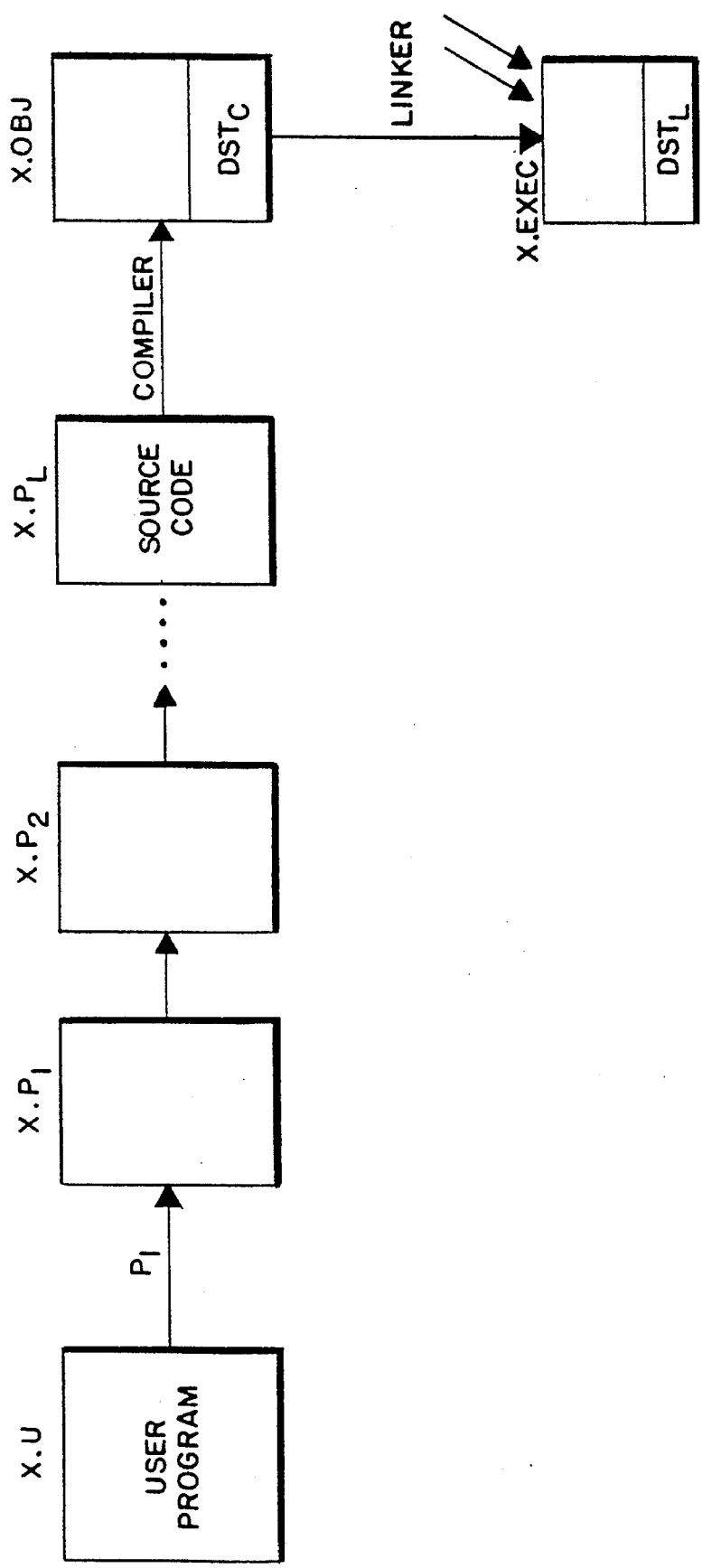
FIG. 2 depicts in block diagram form a translation of a user program to an image file.

FIG. 1 depicts the components of a system 10 involved in transforming a user program into an executable image file. Referring also to FIG. 2, a user program X.U written in a high level programming language is sent from a terminal 12 to a first preprocessor $P_1$, depicted as processor 14 in FIG. 1. This first preprocessor $P_1$ translates the X.U program into an output file $X.P_1$, and sends the file to a next preprocessor $P_2$. Preprocessor $P_2$ uses the file $X.P_1$ as its input file and translates it to an output file $X.P_2$. The preprocessor $P_2$ then sends the file $X.P_2$ to a next preprocessor $P_3$, and so forth, until a last preprocessor $P_L$ translates its input file to an output file $X.P_L$, which is the source code file for the compiler 16. The preprocessors $X.P_2$, $X.P_3$, . . . ,$X.P_L$, are depicted collectively as block 15 in FIG. 1.

The compiler 16 translates the source code file $X.P_L$ into an object code file X.OBJ. The object code file is then sent to a linker 18, which "links" the file with other object code files required for program execution, for example, with related program modules or libraries, and produces an executable image file X.EXEC. The object code file X.OBJ includes a debugger symbol table $DST_c$ which describes translations performed by the compiler. This table is included by the linker in the image file debugger symbol table, which is made available to the debugger 20. The debugger 20 uses the information in the linker's debugger symbol table to interpret source code symbol names and code segments in terms of the object code files.

The system 10 also includes a correlation system 30, which communicates with the preprocessors $P_1$, . . . $P_L$ and the debugger 20, to give the debugger enough information to respond to questions concerning symbols and code segments in the user program X.U. The correlation system 30 can also supply to the debugger information necessary to interpret the preprocessor input or output files $X.P_1$, i=1, . . . , L, including the source code file which is the output file from preprocessor $P_L$, all in terms of the user program. The debugger 20 can then respond to a user's request for an intermediate value of a particular symbol named in the user program, regardless of how many times that symbol name has changed during preprocessing, compiling and linking. The debugger 20 can also respond to a user's request for the value of a symbol at a particular line of the user program, by asking the correlation system 30 to identify the corresponding section of the source code file, $X.P_L$. The debugger can similarly respond to requests concerning evaluation and/or interpretation of user program segments.

The debugger 20 displays error messages in terms of the related segment of the user program. With this information, the user can more easily decipher the error message and determine how to correct the error than he can if the debugger messages are related only to the source code file, as they are in known prior systems.

Before a preprocessor, for example, preprocessor $P_1$, translates its input file to an output file, it sends to the correlation system information which identifies its input file as X.U and its output file as $X.P_1$. If the preprocessor produces several output files, such as output files in several different languages, the preprocessor adds to the identifications an indication of the language, for example, $X.P_1$PAS for an output file in Pascal, and so forth. The correlation system then creates in its data base a source correlation table for each preprocessor input file and a target correlation table for each preprocessor output file. These tables become part of a correlation library associated with the user program.

The preprocessor next sends to the correlation system information which describes a mapping between symbol names and code segments in the preprocessor input file and symbol names and code segments in the preprocessor output file(s), and the correlation system stores this mapping information in the two correlation tables. The $X.P_1$ source correlation table contains an entry for each symbol name and segment of the preprocessor input file which is altered or moved during the translation. The correlation system includes in each entry in the source correlation table a pointer to an associated entry in the target correlation table. The target correlation table has as its entries information identifying the symbol names and the code segments which are included in the associated output file during the translation. The system also includes in each of these entries a pointer to the associated entry in the source correlation table. The pointers thus represent a mapping of symbols and code segments from the preprocessor input file to the preprocessor output file, and the reverse mapping between output and input files.

Figure 3:
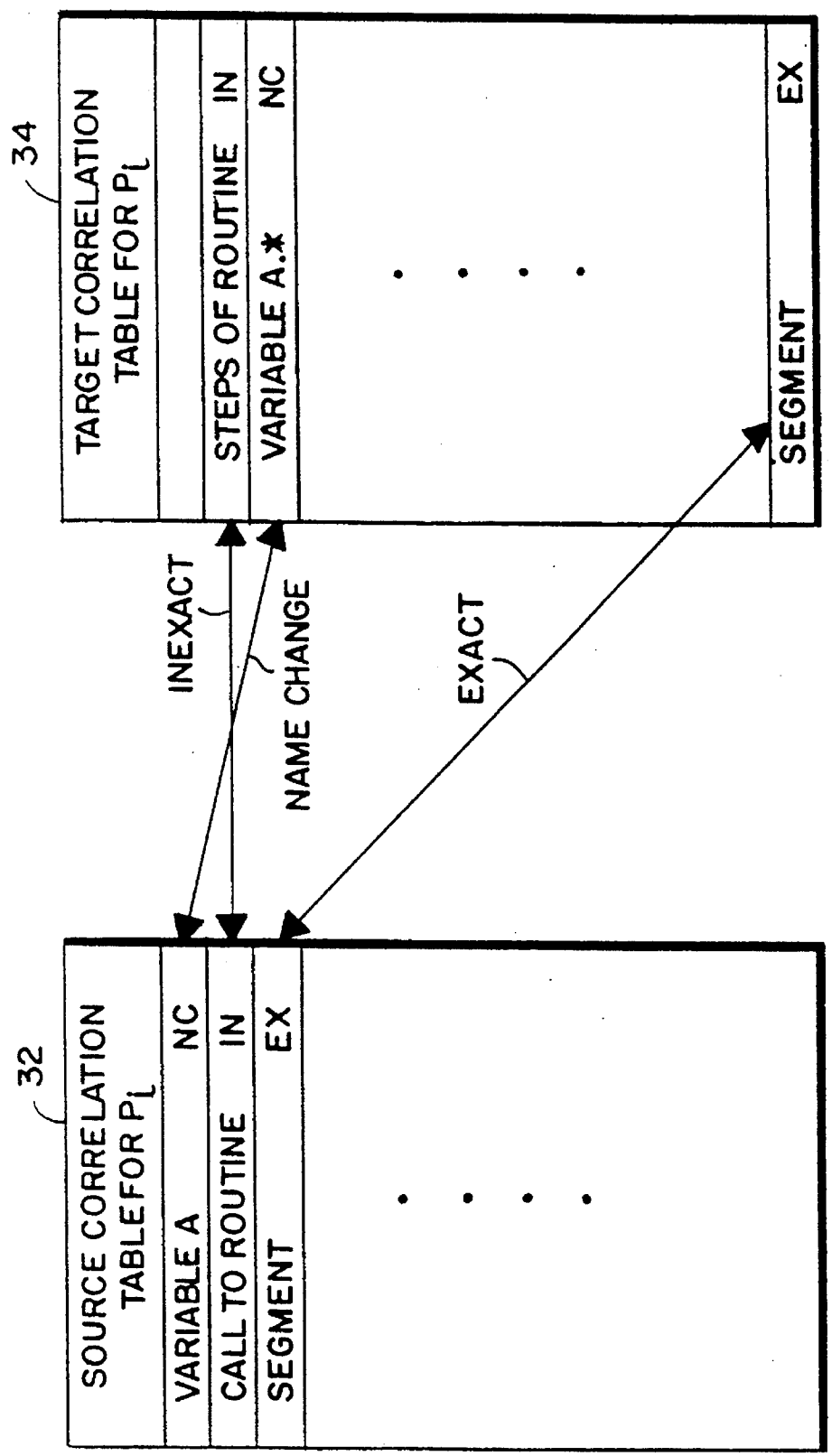
FIG. 3 depicts in block diagram form source correlation and target correlation tables utilized by the system of FIG. 1.

If a particular segment of the preprocessor input file is duplicated in the output file, the correlation system includes two entries in each of its source correlation and target correlation tables. The two entries in the source correlation table refer to the same segment of the input file and point to different segments of the output file. The two entries in the target correlation table correspond to the two copies of the segment in the output file, and each points back to a different one of the entries in the source correlation table. FIG. 3 depicts a source correlation table 32 and a target correlation table 34 in block diagram form, with arrows to illustrate the pointers.

Figure 4:
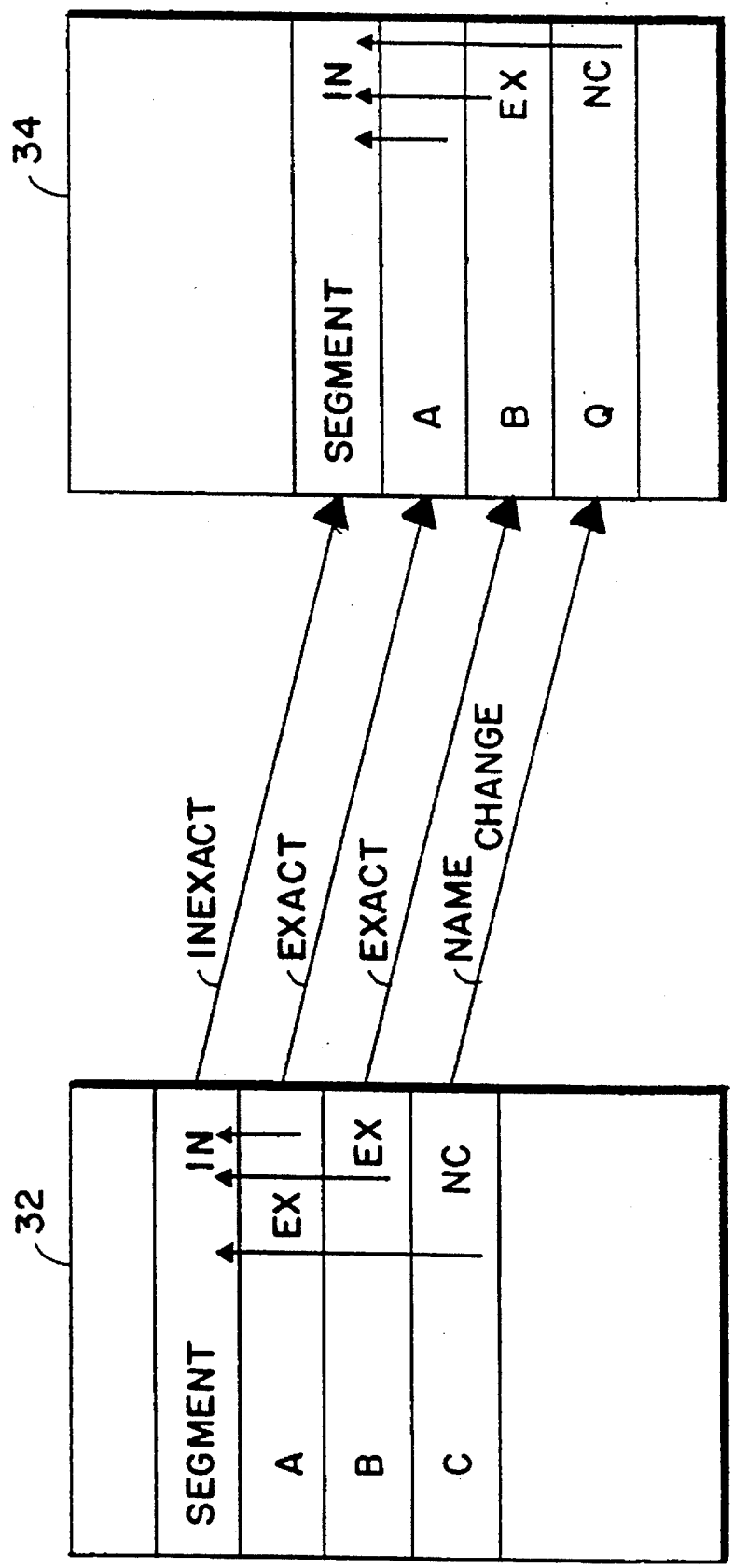
FIG. 4 depicts in more detail the source and target correlation tables of FIG. 3.

The preprocessor also sends to the correlation system information which characterizes each translation as an exact, inexact or name change correlation. An exact correlation identifies a copying of a code segment, character by character, from the preprocessor input file to the preprocessor output file. An inexact correlation identifies a relationship between a code segment in the preprocessor input file and a related, but not identical, segment in the output file. For example, a translation of a call to a routine in the input file to several lines of code representing the steps of the routine in the output file is an inexact correlation. A name change correlation identifies a change in the name of a symbol between the preprocessor input file and the preprocessor output file. An inexact translation of a segment may also include exact, inexact and name change translations of code lines and symbol names. The correlation system includes in each of the source and target correlation tables corresponding entries for each of these translations, with pointers between them and pointers to the related "parent" segment translation, as illustrated in FIG. 4.

If, for example, a preprocessor input file includes the following line of code, or segment:

X$Y(A,B,C)

and the preprocessor translates this segment to:

```
LOOP
   IF A = a
   THEN B = b*A
   ELSE Q = q*A
   ...
``` the correlation system stores in the associated preprocessor correlation tables entries for the segment and each of the variables A,B and C. The entries for the segment translation in the source and target correlation tables each identify the segment by line number(s) in the respective files, and include a characterization of the translation as an inexact correlation. Each entry includes a pointer which points from the entry to a corresponding entry in the source correlation or target correlation table, as appropriate.

The entries in the two tables for the translations of the variables A and B identify the variables and characterize the translations of A and B as exact correlations. Each of these entries include two pointers, one which points to the corresponding entry in the other of the source or target correlation tables and a second one which points to the entry for the parent segment in the same table. The source correlation table entry for the variable C identifies the variable, characterizes the translation as a name change correlation and includes two pointers, one which points to the corresponding entry in the target correlation table and one which points to the entry for the parent segment in the source correlation table. The corresponding entry in the target correlation table identifies the variable as Q, characterizes the translation as a name change correlation and includes the two pointers.

The entries in the source and target correlation tables are arranged in order of variable and segment starting line numbers in the corresponding preprocessor input and output files, respectively. In this example, the entry for the segment translation precedes the entries for variables A, B and C, which occur in order of appearance.

The pointers to parent segment correlations are important, because debuggers determine variable values within a context, or scope. The debugger distinguishes between program variables with the same name by referring to the applicable scope. The debugger interprets a request for a variable value as a request for the same-named variable within the current scope, that is, within the scope of the segment of the source code which corresponds to the portion of the image file then being executed. If, for example, a user requests the value of the variable X at a point in the program execution which corresponds to an inner scope, such as:

```
BEGIN
   DECLARE X,Y
      X=2
   ...
   BEGIN
      DECLARE X     ←user request received
      ...
      X=1
      Y=1
   END
END
``` the debugger returns X=1. If the debugger receives the user's request at a point which corresponds to the outer scope, the debugger responds to the request by returning X=2. The correlation tables include pointers to the parent segments, which enables the correlation system to determine the applicable scope of the variables.

Figure 5:
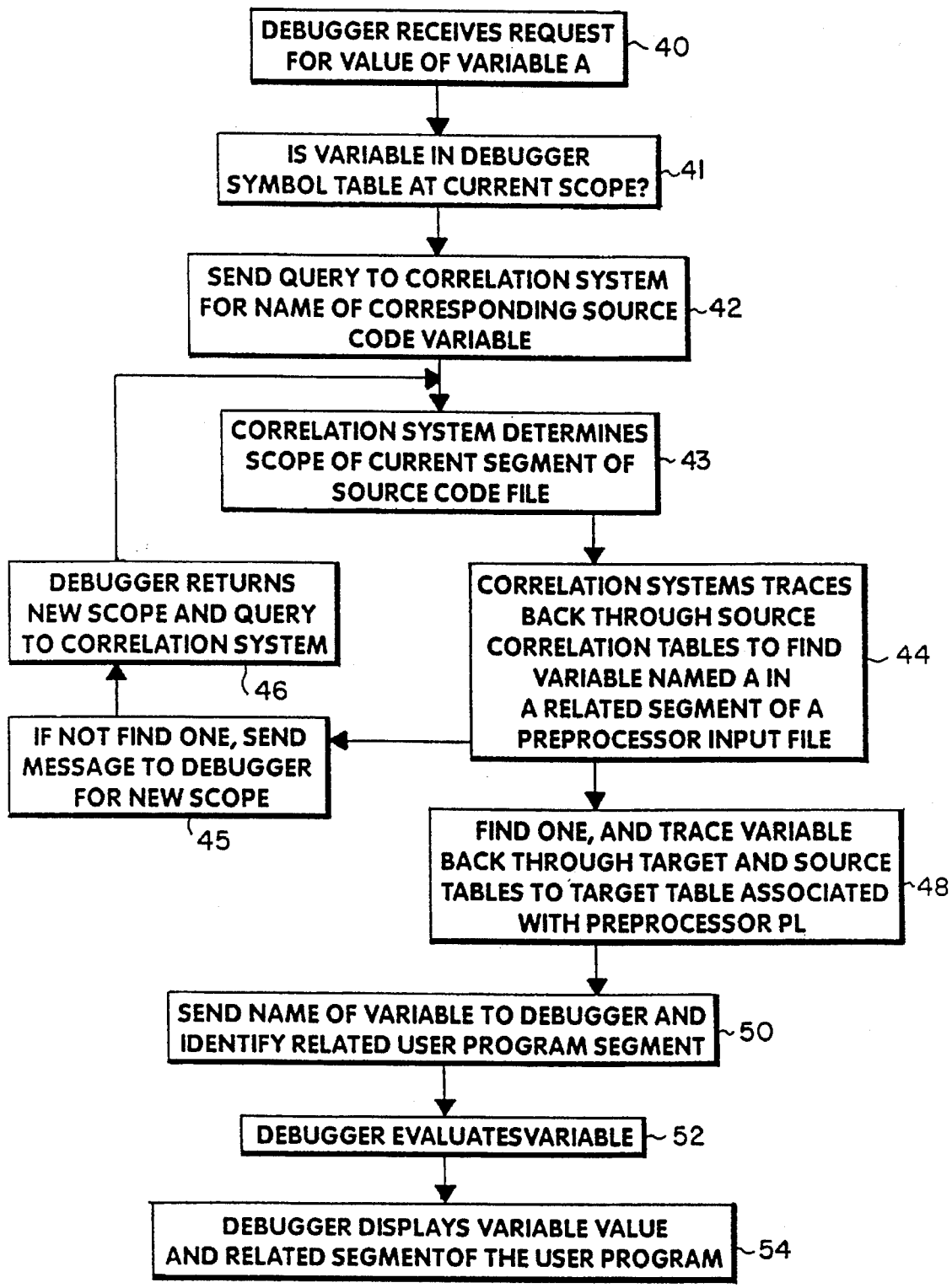
FIG. 5 is a flow chart of the operation of the system of FIG. 1 in finding a related variable.

Referring to FIG. 5 and the following example, in which a user requests an intermediate value of a variable A at a point in the user program which corresponds to the segment:

```
BEGIN
   DECLARE A,Y
   ...
   END
``` and this segment is translated, in source code file, to

```
BEGIN
   DECLARE X,Y
   ...
   END
```

When the debugger receives the request, it checks the debugger symbol table $DST_L$ (FIG. 1), to determine if the variable A is defined within the appropriate source code segment (steps 40–41). Since the debugger does not find the variable name A, it sends a query to the correlation system asking if there is a variable A which (i) corresponds to an entry in a preprocessor source correlation table and (ii) is within the scope of the current segment in the source code file, that is, the $X.P_L$ output file. The debugger also asks in this query that the correlation system trace the variable name back through the preprocessor chain to the "furthest" preprocessor, that is, to the first preprocessor $X.P_1$ in the chain of preprocessors (step 42).

In response to this query, the correlation system traces the segment back through the correlation tables and searches for the variable name A within the corresponding segments listed in the source correlation tables (steps 43–44). If the correlation system does not find the variable name A within the appropriate scope, the system notifies the debugger (step 45). The debugger then selects a larger scope and sends another query to the correlation system (step 46).

If the correlation system finds an appropriate variable named A, the system traces the variable through the associated target correlation table, and through the source and target correlation tables associated with the preceding preprocessor, and so forth, until it reaches the target correlation table associated with the processor $P_L$ (step 48). The system 30 then sends to the debugger 20 the name of the corresponding source code variable (step 50). In this example, the correlation system identifies the source code variable as X. Since the query asked for the "furthest" correlation, the system 30 also identifies the related segment of the user program, which is the input file for preprocessor $P_1$.

Using the information returned by the correlation system, the debugger determines the value of the variable X (step 52). The debugger then displays this value to the user as the intermediate value of the variable A. The debugger also displays to the user the related segment of the user program (step 54).

A user can also send a request to the debugger to display all variables named A in the user program. The debugger sends to the correlation system a query asking for variables named A listed in source correlation tables within the scope of the entire program. The correlation system then finds all the entries for variables named A in the associated source correlation tables and traces them back through the library of tables to determine which of them were named A in the user program. The system then returns to the debugger a list of appropriate variables and associated user program segments.

If the user then asks to examine a particular one of the listed variables, the debugger sends a query to the correlation system asking which segment of the source code file, that is, of the output file of preprocessor $P_L$, corresponds to the segment of the user program associated with the particular variable. The correlation system then traces the segment through the source correlation table associated with the user program, the associated target correlation table, the source correlation table associated with the next preprocessor in the chain, and so forth, and identifies a related segment in the source code file $X.P_L$. The operations of the correlation system are described in more detail below with reference to FIG. 6.

The user can request that the debugger display symbol names and code segments used by the various preprocessors. A user may, for example, request that the debugger show the lines of code which a preprocessor substituted for a call to a routine in the user program. The debugger sends to the correlation system a query which asks for a segment of a preprocessor output file which corresponds to the code segment of the user program that includes the call to the routine. The debugger also specifies that the correlation system is to find the "closest" correlation.

In response, the correlation system stops its search once it finds an entry for the segment in a source correlation table. If this is not the information sought by a user, the debugger can again request that the correlation system trace the segment and identify the closest translation. The correlation system searches through the source correlation table associated with the next preprocessor in the chain. If the system finds an entry, it again ends its search and identifies the segment to the debugger. Otherwise, the correlation system searches through the correlation table associated with the next preprocessor, and so forth, until a related translation is found.

The correlation system can also trace a code segment or a symbol name from the source code file, which is the preprocessor output file $X.P_L$, to any preprocessor input file, including the user program, which is the input file for preprocessor $P_1$. The system begins such a search at the $X.P_L$ target correlation table. The debugger specifies in the query that the segment or symbol name for which it is searching is either in a preprocessor input file or a preprocessor output file, and also specifies if the system is to stop at the "closest" translation or look for the "furthest." This query thus directs the correlation system to trace the segment or symbol backward through the chain of preprocessors and also directs it when to stop.

Figure 6:
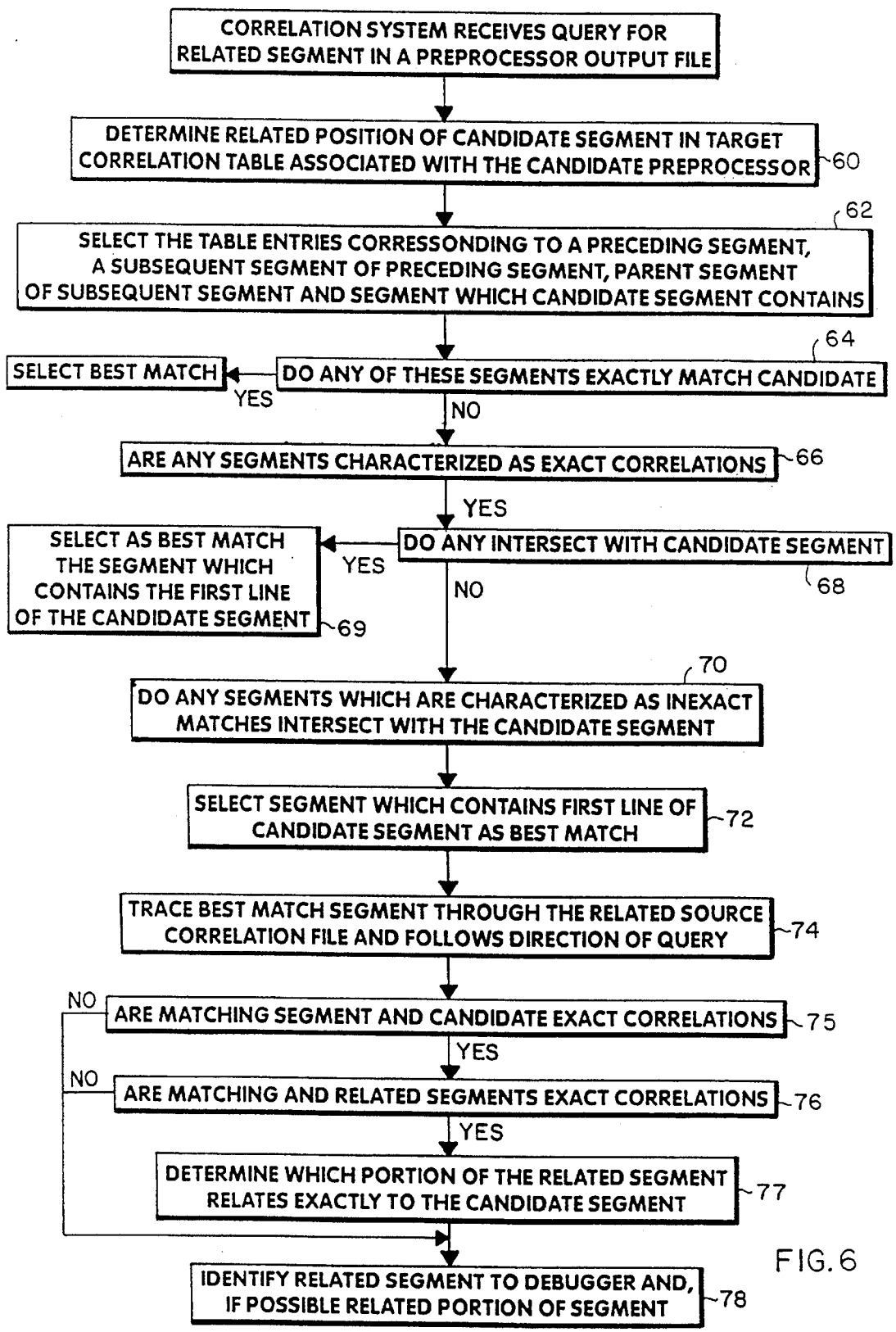
FIG. 6 is a flow chart of the system of FIG. 1 in finding a related segment.

The correlation system begins its search for a segment which corresponds to a particular segment, i.e., a "candidate" segment, by finding which of the segments defined in the associated correlation table is a best match for the candidate segment. The correlation system can then trace this defined segment through the library of correlation tables as directed by the query. Referring to FIG. 6 and an example in which the candidate segment is in a preprocessor output file, the correlation system responds to a query for a related segment in a subsequent preprocessor output file by determining the relative position of the candidate segment in the associated target correlation table (step 60). Since these entries are arranged in order of the starting line numbers of the defined segments, the correlation system positions the candidate segment between a segment which begins with a smaller line number and one that begins with a larger line number.

The correlation system then selects up to five segments from the target correlation table, namely, (i) the segment which precedes the candidate segment, (ii) the segment which follows the candidate segment, (iii) the segment which contains the preceding segment, (iv) the segment which contains the following segment, and (v) the segment which is contained by the candidate segment (step 62). Some of these segments may not exist, for example, there is no segment which precedes the first segment in the preprocessor output file,.

From these selected segments, the correlation system first looks for a segment that is the same as the candidate segment, that is, an exact correlation (step 64). If it finds such a segment, the system selects it as the best match (step 65). If the system does not find such a segment, the system looks for selected segments which are exact correlations to input file segments and which intersect the candidate segment (steps 66–67). The correlation system then chooses as the best match the segment which contains the first line of the candidate segment (step 69). If the system finds no such segment, the system determines if any of the selected segments are inexact correlations and intersect the candidate segment (step 70). The system then chooses as the best match the intersecting segment which contains the beginning line of the candidate segment (step 72).

The correlation system then traces the matching segment through the chain of preprocessors to a related segment in the source or target correlation tables which correspond to the terms of the query (step 74). If this segment and the best matching segment are exact correlations, and the matching segment and the candidate segment are exact correlations, the system performs a character by character comparison to determine which portion of the related segment corresponds to the candidate segment (steps 75–77). If any correlation is inexact, the system characterizes the correlation between the candidate segment as inexact, and does not attempt to compare the candidate segment with any particular portion of the segment which corresponds to the matching segment (step 78).

The correlation system creates separate tables for each program "unit," that is each section of the user program which can be separately preprocessed. The preprocessors thus define the units. In many preprocessors, the entire file in a unit. However if a preprocessor translate files to various languages, for example, it creates a unit for each of the languages. Similarly, if a file includes several routines and/or several modules, a preprocessor may create a unit for each routine and for each module. These preprocessor units are similar to compiler units and, like compiler units, may be updated all together or separately.

The correlation system similarly creates for each unit separate source and target correlation tables. These tables contain information relating to the changes in the various units and may be merged into a shared table, or library, associated with the program as a whole. In this way, units can be separately tested and modified, without affecting the operation of the other units. This is particularly important when different users are working simultaneously with different units. When a user incorporates the modified unit into the program, he instructs the correlation system to overwrite the portion of the correlation library associated with the unit. The correlation system leaves the remainder of the library unaltered.

In summary, the correlation system creates for each user program a correlation library which contains information which traces symbol name and code segment translations of user programs to source code files, and vice versa, and includes every intermediate translation performed by preprocessors. A user can thus follow a these translations to better understand the program, which gives the user an advantage in attempting to correct errors or modify a program to achieve desired results. Similarly, an analysis tool, such as the debugger, can trace source code symbol names and code segments back to names and code segments in the user file.

While the invention is described above in connection with a debugger, the invention may be used with any type of program analysis tool, such as, for example, performance analyzers, browsing tools, or tools which decipher compiler error messages. These tools conventionally analyze the operation of the program and present information to the user in terms of the image file or source code file. With the correlation system, these tools can present performance, browsing and error message information to the user in terms of the user program.

The correlation system works with all types of preprocessors. Each preprocessor need only inform the correlation system of the changes it makes in translating its input file to its output file. The correlation system then relates these changes to changes made by preceding and subsequent preprocessors in order to trace symbols and code segments through a chain of preprocessors. Thus any number of preprocessors, working in any number of languages, can be chained together and the translations made by each of them traced by the correlation system.

I claim:

1. In a computer system, an apparatus for correlating names of symbols and locations of code segments of computer programs comprising:

a plurality of preprocessors, each preprocessors translating an input file to an output file, the plurality of preprocessors serially connected to each other such that the output file of a previous serially connected one of the plurality of preprocessors is the input file of a next serially connected one the plurality of preprocessors, the input file of a first serially connected one of the plurality of preprocessors being a user program, the output file of a last serially connected one of the plurality of preprocessors being a source program, each input file and each output file including symbols having names and segments having locations, the plurality of preprocessors altering the names of the symbols and moving the locations of the segments while translating;

a compiler coupled to the last preprocessor, the compiler for translating the source program to an executable object code file;

correlation means coupled to the plurality of preprocessors, the correlation means to communicate with the plurality of preprocessors during translation;

a computer accessible memory, the memory storing a correlation database created by the correlation means while communicating with the plurality of preprocessors, the correlation database comprising:

a source correlation table for each input file, the source correlation table including a plurality of input entries, the input entries including an input symbol name entry for each symbol of the input file having its name altered during translation, and an input segment location entry for each segment of the input file having its location moved during translation;

a target correlation table for each output file, the target correlation table including a plurality of output entries, the output entries including an output symbol name entry for each symbol of the output file having its name altered during translation, and an output segment name entry for each segment of the output file having its location moved during translation;

forward pointers for mapping each input entry to the corresponding output entry;

backward pointers for mapping each output entry to the corresponding input entry; and means for tracing names of symbols altered and locations of segments moved by the plurality of preprocessors from the user program to the source program, and from the source program to the user program.

2. The apparatus of claim 1 further comprising:

each input entry and each outentry including a characterization of the corresponding translation as exact, inexact, or name change.

* * * * *